Oct. 22, 1968  N. BUCHNER ET AL  3,406,891
CONTAINER, PARTICULARLY FOR LIQUIDS, WITH
A DEEP DRAWN METAL FOIL COVER
Filed Oct. 14, 1965

INVENTORS
NORBERT BUCHNER
BY  ROLF KÖHNLEIN

ATTORNEY

United States Patent Office 3,406,891
Patented Oct. 22, 1968

3,406,891
CONTAINER, PARTICULARLY FOR LIQUIDS, WITH A DEEP DRAWN METAL FOIL COVER
Norbert Buchner, Beutelsbach, Wurttemberg, and Rolf Köhnlein, Stuttgart-Rotenberg, Germany, assignors to Firma Fr. Hesser Maschinenfabrik A.G., Stuttgart-Bad Cannstatt, Germany, a corporation
Filed Oct. 14, 1965, Ser. No. 495,788
Claims priority, application Germany, Oct. 14, 1964, H 54,028
9 Claims. (Cl. 229—3.5)

ABSTRACT OF THE DISCLOSURE

A container of generally tubular configuration having a laminated wall section composed of a layer of fibrous material and of aluminum foil, with the outside surface of both layers being coated with thermoplastic material such as polypropylene. A top and bottom cover of deep drawn metal foil has a U-form shaped rim portion with the surface of each cover facing the container being coated with thermoplastic material. The U-shaped portion of the cover is telescoped over the container body and a heat seal is established therebetween. In the modification the U-formed rim portion of the cover has a ring-like reinforcing bead which facilitates an extra heavy seal between the container body and the cover.

---

This invention pertains generally to a shipping and dispensing container and, more particularly, to a container of multilayer construction, including metal foil.

The container herein under consideration is adapted to be sterilized and employed for carrying easily spoiled fill goods, particularly liquids. Such containers are already known and, conventionally, comprise an outer tubular shell with fixed covers at opposite ends. The shell body, or jacket, is made of paper or light weight carton material coated with a barrier layer of thermoplastic material. The covers are provided with suitable folds and made of a deep drawn, thermoplastic, foil material. The fold edges of each cover are welded to the inside surface of the shell edge.

One of the disadvantages encountered with the container of the prior art, is that exposure to elevated temperatures, as necessarily occurs during the filling of the container with hot liquids and/or the sterilization thereof, causes the lid of thermoplastic material to partly melt or soften. In consequence, the weld seam between the cover, or covers, and the container shell loses in strength. Frequently, the seam becomes deformed and the desired leakage seal in part broken.

The container in accordance with this invention avoids these disadvantages, by constructing the cover of the container of a metal foil material of which at least one side is covered with a layer of a synthetic material. The fold edge, or flange, has a U-like configuration and is welded on the front and the back side of the terminal portion of the container jacket. The metal foil imparts sufficient strength to the weld seam preventing a deterioration of or deformation in the thermoplastic material of the cover even though a slight softening in the material may occur.

Inasmuch as the metal foil is a much better heat conductor than the thermoplastic material or paper, it will be appreciated, the heat sealing can be attained in a fraction of the original time formerly required to perform this step.

Another advantage of the invention over the known thermoplastic covers, resides in the unexpected and substantial increase in the bursting strength of the container. This improvement arises from the following condition.

When the internal pressure in the container causes certain portions of the weld seam to be split, or come apart, these portions are then supported by the external seam between outer jacket of the container and the cover. This outer seam is however only subject to shear forces and hence is capable to absorb considerably increased forces.

Therefore the primary object of this invention is to provide a shipping and dispensing container of improved construction.

A further object of this invention is to provide a container utilizing a composite foil cover to prevent a deformation of the cover during sterilizing and/or hot filling of the container.

A further object of this invention is to provide a container having improved thermodynamic characteristics permitting a reduction in the heat seal time of the cover to the jacket with a consequent increase in the efficiency of the packaging process.

A further object of this invention is to provide a container of the type referred to having increased burst strength properties.

A still further object of this invention is to provide a container of the described character which is constructed with a suitably coated metal foil cover having a fold uniquely adapted for securely weld sealing the container.

An aspect of the present invention resides in the provision of a container, particularly for liquid goods. The container body, or shell, is essentially composed of a laminated sheet of which the front and back side is covered with a layer of material, such as polypropylene, which is effective to establish heat sealing. The cover for the container body is formed of a metal which is covered at least on one side with a layer of thermoplastic material. From the periphery of the cover depends a U-form shaped marginal flange, or fold, for mating with one end of the cover. The thermoplastic material on the one side of the flange is effective to provide a continuous weld seam with the front and back layer of the container body when a suitable amount of heat is applied thereto.

For a better understanding of the present invention, together with other and further objects thereof, reference is had to the following description taken in connection with the accompanying drawings, and their scope will be pointed out in the appended claims.

Figure 1:
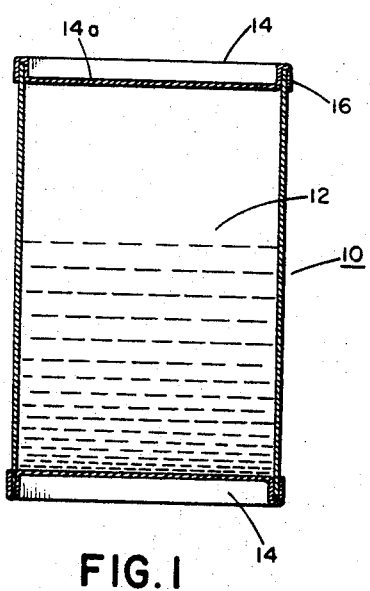
FIGURE 1 is an elevational view of a container embodying the present invention.
Figure 2:
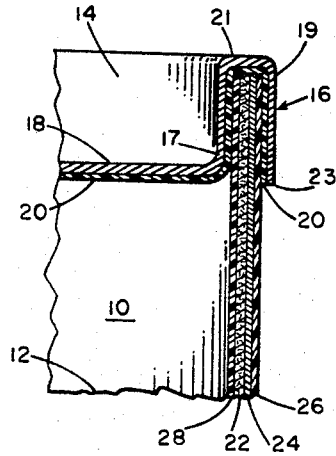
FIGURE 2 is an enlarged and fragmentary view of the container similarly shown in FIGURE 1.

Referring now to the drawing and, more particularly, to FIGURES 1 and 2, a container is there illustrated and indicated by the reference numeral 10. The container comprises a tube-like container body 12 of square-like cross-section with rounded corners, generally referred to as a jacket or shell, and a cover 14 at each end. The container body cross-section can also be circular or of some other configuration.

Each cover 14 is preferably formed of a deep drawn aluminum foil 18 and the inwardly facing surface thereof is covered with a layer 20 of suitable, heat sensitive thermoplastic material such as polypropylene. The cover 14 is suitably formed to conform to the cross-sectional configuration of the jacket 12. From the circumference of the cover depends a marginal double flange 16, of substantially U-like configuration in a coaxial direction. The flange has a pair of axially elongated, parallel extending, and radially spaced arms 17, 19; the axial length of each arm is substantially the same. A substantially flat, radially extending, horizontal portion 21 joins the arms 17 and 19. As viewed from the drawings, the flange 16 extends upward of the central cover portion, see 14a, and the bottom of the flange as indicated by reference numeral 23 is approximately in the same plane as the cover part 14a. The flange portion 16 of the cover 14 is telescoped over the jacket 12 for slight frictional engagement of the flange arms 17 and 19 with the jacket 16 which is juxtaposed therebetween, to suitably hold the cover in place in relation to the container body 12.

The jacket 12 of the container is a multilayer composite structure and in the preferred embodiment composed of a layer of paper 22, or the like. Superposed on paper 22 is a sheet of aluminum foil 24, and layers 26 and 28 formed of a thermoplastic material such as polypropylene cover the front and back of the laminated structure.

As noted above, the cover 14 with the U-form like flange 16 has a cross-section of such a dimension that the same can be placed, without difficulty, over the container jacket 12. The marginal flange 16, and more particularly the arms 17 and 19 thereof, are pressed to and between the jacket and heat sealed by means of heat jaws which are not illustrated. The thermoplastic characteristics of polypropylene permit a softening of layers 20, 26 and 28 in response to heat applied thereto and fusion may result. Cooling solidifies the molten portions establishing a continuous, liquid sealing, weld seam between cover 14 and jacket 12. This action also causes the metal foil flange 16 to exert upon the jacket a permanent mechanical clamping force whereby the seam is maintained under a constant positive pressure.

The clamping effect is of particular benefit when the packing container has already been filled and closed and is being sterilized. The required elevated temperature leads frequently to a softening of the thermoplastic layers. However, the cover in accordance with the invention provides a stiffening effect upon the weld seam.

Figure 3:
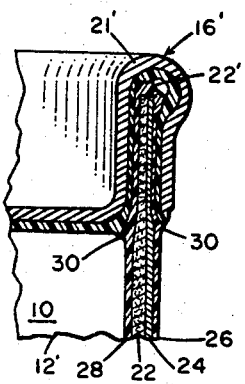
FIGURE 3 is a fragmentary view similar to FIGURE 2, showing a modified container construction in accordance with this invention.

Turning now to FIGURE 3 there is shown a modification of this invention. The marginal flange 16' is pressed in such a manner and portion 21' is curved in such manner, that a ring-like reinforcing bead results at the circumference of the cover to enhance the form stability of the container package.

A destruction of the internal seam could, possibly, permit the liquid in the container, particularly during transportation of the package, to seep into the wall portions of the container and ultimately affect the structural strength of the paper or carton layer of the jacket. In order to avoid such eventuality, the metal foil of the cover is coated with a layer of thermoplastic material of suitable thickness which at least in the region of the marginal flange portion is sufficient to provide an extra heavy sealing layer around the cutting edges of the container jacket as indicated at 22'. More specifically, in fabricating the weld seam between the container jacket and the cover flange, a certain amount of the thermoplastic material is pressed out to seal the area adjacent the cutting edge (22') of the jacket 12' and to simultaneously provide a bead between the ends of the flange and the cover as indicated at 30.

Alternatively, or in combination with the foregoing, it is also possible to provide the cover with an additional adhesive layer to cover the edges of the flange 16, or to superimpose such a layer over the cutting edges of the container jacket.

It is obvious to those skilled in the art that the cover in accordance with this invention may, quite readily, be adapted with conventional spout and/or other dispensing means.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:
1. A container comprising: a container body composed of a laminated sheet having on the front and back surface thereof a layer of material effective for heat sealing; and a cover formed of a deep drawn metal foil covered on one side thereof with a layer of thermoplastic material and having at the periphery a U-form shaped marginal flange for mating with one end of said body, the thermoplastic material on said flange being effective to provide a substantially continuous weld seam with the front and back layer of said body in response to heat application to provide a liquid-tight container.

2. A container according to claim 1, wherein said metal foil is aluminum.

3. A container according to claim 1, wherein said layer of material effective for heat sealing, is formed of a thermoplastic material and effective to fuse with the U-form shaped cover material in response to heat application.

4. A container according to claim 3, wherein said thermoplastic material is polypropylene.

5. A container according to claim 3, wherein said U-form shaped flange is composed of a pair of axially elongated, parallel extending, radially spaced arms adapted for receiving in juxtaposition the container body between said arms, and wherein the closed end of the marginal flange provides a ring-like reinforcing bead.

6. A container according to claim 5, wherein the layers of thermoplastic material within said flange are relatively thick adjacent to the end of the container body in comparison to other areas within said flange.

7. A container according to claim 6, wherein a bead composed of pressed out thermoplastic material is formed adjacent to the front and back areas of said body at a location where said juxtaposition terminates.

8. A container comprising: a laminated container body composed of a layer of paper-like material and superposed aluminum foil, the resulting composite being coated on the front and back side thereof with a layer of thermoplastic material; and a cover having at the periphery a U-form shaped marginal flange for mating with one end of said body, said flange having a pair of axially elongated, parallel extending, radially spaced arms, said cover being composed of aluminum foil and at least one side thereof covered with a layer of thermoplastic material, said cover being constructed for placing face to face the thermoplastically coated front and back side of said body each with one of the thermoplastically coated, radially spaced, arms of said flange for heat fusion therebetween in response to heat application.

9. A container according to claim 8, wherein the container body is juxtaposed between the radially spaced arms of said flange and a substantially continuous weld seam is provided therebetween.

References Cited
UNITED STATES PATENTS

| | | | |
|---|---|---|---|
| 2,555,380 | 6/1951 | Stuart et al. | 229—3.5 |
| 3,126,797 | 3/1964 | Carpenter et al. | 229—14 X |
| 3,129,867 | 4/1964 | Schroeder | 229—14 |
| 2,182,882 | 5/1965 | Aellen et al. | 229—4.5 |

FOREIGN PATENTS

| | | |
|---|---|---|
| 937,918 | 9/1963 | Great Britain. |

DAVIS T. MOORHEAD, *Primary Examiner.*